No. 716,986. Patented Dec. 30, 1902.
W. F. COLLINS.
NUT LOCK.
(Application filed July 9, 1902.)

(No Model.)

WITNESSES:
Jas. E. Hutchinson.
E. Keiser.

INVENTOR
W. F. Collins
BY Swift and Co.,
ATTORNEYS.

UNITED STATES PATENT OFFICE.

WALLACE FIELD COLLINS, OF LEARNED, MISSISSIPPI.

NUT-LOCK.

SPECIFICATION forming part of Letters Patent No. 716,986, dated December 30, 1902.

Application filed July 9, 1902. Serial No. 114,935. (No model.)

*To all whom it may concern:*

Be it known that I, WALLACE FIELD COLLINS, a citizen of the United States, residing at Learned, in the county of Hinds and State of Mississippi, have invented a new and useful Nut-Lock; and I do hereby declare the following to be a full, clear, and exact description of the invention, such as will enable others skilled in the art to which it appertains to make and use the same.

The invention relates to improvements in nut-locks; and it has for its object to provide a simple, inexpensive, and efficient nut-lock adapted to be readily applied to a rail-joint and capable of securely locking the nuts thereof and of preventing the same from being accidentally unscrewed by the vibration of the rails.

The invention consists in the construction and novel arrangement of parts hereinafter described and shown, and pointed out in the claim hereto appended.

Figure 1:
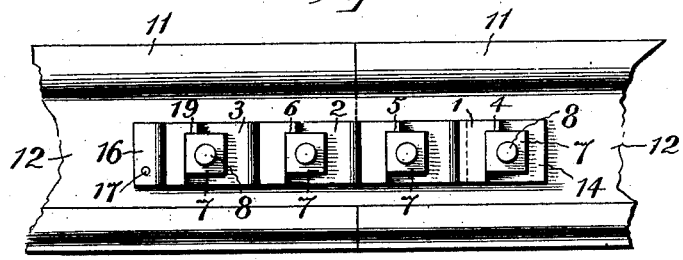
Figure 2:
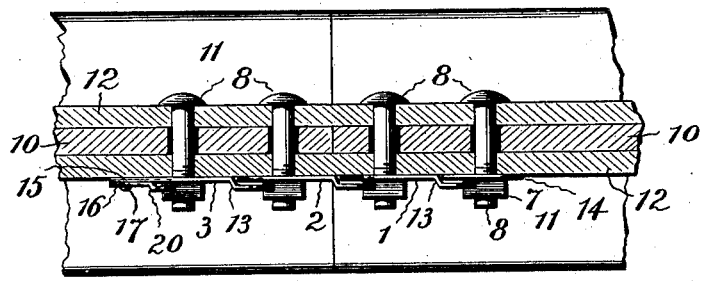
Figure 3:
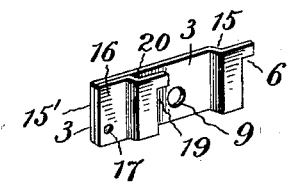
Figure 4:
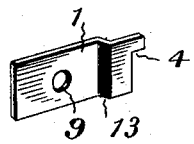

In the drawings forming part of this specification, and in which like numerals of reference designate corresponding parts, Figure 1 is an elevation of a nut-lock constructed in accordance with this invention and shown applied to a rail-joint. Fig. 2 is a horizontal sectional view of the same. Fig. 3 is a detailed perspective view of the end plate having the pivoted locking-plate. Fig. 4 is a detailed perspective view of one of the other plates.

Referring to the drawings, 1, 2, and 3 designate resilient nut-engaging plates designed to be arranged on the nuts at a rail-joint, as clearly shown in Fig. 1 of the drawings, and constructed of sheet metal or other suitable material and provided at their engaging ends with angular recesses 4, 5, and 6, conforming to the configuration of the nuts 7 of the bolts 8 and adapted to lock the same against rotation. The plates 1 and 2 are constructed substantially the same and are provided at their other ends with bolt-openings 9 and adapted to receive the bolts, whereby they are secured to the rail-joint. The bolts pass through the webs 10 of the rails 11 and through opposite fish-plates 12 in the usual manner, and the nut-engaging plates are located at the outer sides of the rails. The plates 1 and 2 are provided between their ends with vertical bends 13, which offset the engaging ends of the plates 1 and 2 from the fish-plate and enable the recessed ends of the nut-locking plates to engage the nuts at points between the inner and outer faces of the same, whereby the nuts are effectually prevented from slipping over the said plates 1 and 2. A plate or washer 14 is preferably interposed between one of the end nuts and the fish-plates to arrange the nuts in the same plane, and the end plate 3 is provided with a bend 13, similar to the bends heretofore described, and it has an extension 15, to which is secured a pivoted locking-plate 17. The locking-plate 16 is secured at its outer end by a rivet 17 to the end plate 3, and it is provided at its other end with an angular recess 19, and it has an intermediate bend 20, which offsets the recessed end from the end plate 3. The nut-engaging plates are successively applied in the order numbered, and they are pivotally mounted by means of the bolts and are adapted to be readily swung upward out of engagement with the same when the nuts are loosened. The nuts are successively unscrewed, the pivoted locking-plate being swung upward first to release the adjacent end nut, and the latter is then loosened to release the end plate 3. The operation is continued until all the nuts are adjusted or removed, as desired.

It will be seen that the nut-lock is exceedingly simple and inexpensive in construction, that it is easily applied to a rail-joint, and that it is capable of securely locking the nuts thereof. It will also be apparent that the nut-lock may be removed without injuring it or the nuts.

What I claim is—

In a nut-lock for rail-joints, the combination with a rail-joint having a series of transverse bolts provided with nuts, of a series of locking-plates pivoted to the rail-joint by the bolts and provided with nut-receiving recesses and engaging the nuts of the adjacent bolts, one of the end plates being provided with an extension, and an end locking-plate pivoted to the extension and engaging the nut of the adjacent end bolt, substantially as described.

In testimony whereof I have hereto affixed my signature in the presence of two witnesses.

WALLACE FIELD COLLINS.

Witnesses:
J. D. RIGGIN,
W. B. DICKSON.